Patented Oct. 29, 1940

2,219,293

UNITED STATES PATENT OFFICE 2,219,293

ALUMINUM CONTAINER FOR HYDROGEN PEROXIDE

Max E. Bretschger, Hans O. Kauffmann, and Frederick A. Gilbert, Buffalo, N. Y., assignors to Buffalo Electro-Chemical Company, Inc., Buffalo, N. Y.

No Drawing. Application July 13, 1936, Serial No. 90,440

10 Claims. (Cl. 23—240)

This invention relates to metallic containers for hydrogen peroxide solutions and more particularly to aluminum containers treated to withstand attack by hydrogen peroxide.

Repeated statements are found in the literature that hydrogen peroxide attacks metallic aluminum, with the formation of pits and holes, and attempts to use hydrogen peroxide in contact with metallic aluminum containers heretofore have been unsuccessful unless the surface of the aluminum container, in contact with the peroxide, had been given a protective treatment.

Suggestions have been made heretofore to coat the interior of metallic aluminum containers, used for transportation or storage of hydrogen peroxide, either with certain mixtures of paraffin and petrolatum or the like, or to coat the metallic aluminum with an artificial film of oxide by oxidizing the interior surface of the container with nitric acid as an oxidizing acid.

In accordance with the present invention and contrary to the prior teachings, metallic aluminum is used for storage vessels of hydrogen peroxide. However, the surface of the aluminum container is cleaned or etched with a non-oxidizing acid, that is, one which reacts with metallic aluminum without decomposition of its anions probably removing the adhering oxide film, so that the aluminum metal is exposed to contact with the hydrogen peroxide therein. Thus, an aluminum container, such as an aluminum drum used for transportation of hydrogen peroxide, is filled with phosphoric acid at room temperature and permitted to stand for about one to two hours, the phosphoric acid removed and the drum rinsed with water. The phosphoric acid may be brushed or sprayed upon the interior surface of the container or a small amount placed in the container and agitated therein until the desired contact is obtained. This treatment probably removes the tightly adhering aluminum oxide and leaves a fresh surface of aluminum. Where the drum is not initially clean it should be washed well with soap and water or with lye or caustic soda solution to remove grease, etc., and well rinsed with water prior to the surface etching with the non-oxidizing acid. In some cases it may be found advantageous to clean the metal surface initially with organic solvents such as carbon tetrachloride, naphtha and the like.

The strength of acid used to etch the interior surface and prepare the same to resist attack by hydrogen peroxide may be either dilute or concentrated phosphoric acid. As shown by Table 1 below, a wide range of concentration of phosphoric acid is suitable for the purpose. Strips of metallic aluminum were cleaned as above described and immersed in aqueous phosphoric acid for one-half hour, washed and then immersed in 100 volume peroxide in glass for six days and the strip examined for pitting.

Table 1

| Strength of phosphoric acid in percent | Time of contact with aluminum strip in days | Concentration of peroxide | Condition of strip after contact |
|---|---|---|---|
| | | Volume | |
| 10 | 6 | 100 | Not pitted. |
| 20 | 6 | 100 | Do. |
| 35 | 6 | 100 | Do. |
| 50 | 6 | 100 | Do. |
| 75 | 6 | 100 | Do. |
| 0 | 6 | 100 | Heavily pitted after 12 hours. |

As shown in the above table no pitting was observed of the aluminum strip after six days contact with 100 volume hydrogen peroxide after the strips had been treated or etched with phosphoric acid. The strip not etched or treated with phosphoric acid was heavily pitted and much white floc had settled to the bottom of the glass container and collected upon the aluminum strip, the surface of which was very rough and uneven. The interior of an aluminum drum treated or etched with 50% phosphoric acid and filled with 100 volume hydrogen peroxide showed no pitting after six months standing.

The etching action of the metal appears to be rapid and the effect desired obtained within a comparatively short time. Contact time of 15 minutes with phosphoric acid prepared the surface of the aluminum strip to resist attack by hydrogen peroxide to the same degree as contact of four hours or more as shown in Table 2.

Table 2

| Strength of phosphoric acid in percent | Time of contact with phosphoric acid | Strength of peroxide | Period of immersion in peroxide in days | Condition of strip after contact |
|---|---|---|---|---|
| | Minutes | Volume | | |
| 50 | 15 | 100 | 6 | Not pitted. |
| 50 | 30 | 100 | 6 | Do. |
| 50 | 60 | 100 | 6 | Do. |
| 50 | 90 | 100 | 6 | Do. |
| 50 | 240 | 100 | 6 | Do. |
| 0 | 0 | 100 | 6 | Heavily pitted after 12 hours. |

There appears to be no relation between the hydrogen ion concentration of the hydrogen peroxide solution and the pitting of the peroxide provided the aluminum be first etched with the non-oxidizing acid. Table 3 shows the results of immersion of phosphoric acid treated strips in 100 volume hydrogen peroxide of variable pH's from 0.9 to 6.5, and in fact, the aluminum is not attacked upon the acid side in the acid range of commercial hydrogen peroxide, i. e., below a pH of 7.

Aluminum strips were etched with 50% phosphoric acid for one and one-half hours, and immersed in 100 volume hydrogen peroxide contained in glass at a specified pH, with results as shown in Table 3.

Table 3

| Acidity of peroxide expressed in pH values | Time of contact with hydrogen peroxide in days | Condition of strip after contact |
|---|---|---|
| 0.9 | 5 | Not pitted. |
| 1.2 | 5 | Do. |
| 1.7 | 5 | Do. |
| 2.0 | 5 | Do. |
| 2.5 | 5 | Do. |
| 3.1 | 5 | Do. |
| 3.5 | 5 | Do. |
| 4.1 | 5 | Do. |
| 4.6 | 5 | Do. |
| 5.1 | 5 | Do. |
| 5.4 | 5 | Do. |
| 6.0 | 5 | Do. |
| 6.5 | 5 | Do. |

Non-oxidizing acids, other than phosphoric acid, suitable for treating the interior of the aluminum container include sulphuric acid, hydrochloric acid, hydrobromic acid, formic acid, acetic acid and those organic aliphatic acids that are soluble in water. However, with the exception of formic and acetic acid, the time of contact required to produce the desired surface condition by use of organic acids is exceptionally great and practical considerations dictate the use of the two organic acids mentioned.

In general, the inorganic acids are preferred, although acetic acid may well be used for the production of a good etch. In general, the etch can be furnished with any suitable concentration of acid, and the time of contact need not be great, a good etch being obtained within a half hour. Table 4 shows the protective effect of various non-oxidizing acids, strips of treated aluminum being immersed in 100 volume hydrogen peroxide for several days and then examined for pitting.

Table 4

| Etching acid | Strength of acid | Time of etching | Time of contact with hydrogen peroxide | Condition of strip |
|---|---|---|---|---|
| | Percent | Hours | | |
| Sulfuric | 50 | 1½ | 5 days | Not pitted. |
| Formic | 50 | 1 | 5 days | Do. |
| Acetic | 50 | 1 | 5 days | Do. |
| Propionic | 50 | 1 | 5 days | Do. |
| Hydrochloric | 3.8 | 1½ | 5 weeks | Do. |

Hydrochloric acid solutions of not too great concentration may be used to etch the aluminum and induce the protective effect toward hydrogen peroxide. Table 5 shows the results of contact with hydrogen peroxide upon hydrochloric acid treated aluminum strips.

Table 5

| Normality of hydrochloric acid | Time of contact with 100 volume peroxide | Condition of strips |
|---|---|---|
| | Weeks | |
| 1.0 | 5 | Strip not visibly pitted but a slight floc in the solution. |
| 0.5 | 5 | No visible pitting action, no precipitate. |
| 0.3 | 5 | No pitting. |
| 0.14 | 5 | Do. |

Low concentration of hydrochloric acid will induce protective action upon metallic aluminum so that the same may be used in contact with hydrogen peroxide without attack by the peroxide. As shown in Table 5 the concentration of hydrochloric acid most suitable for etching aluminum is less than about 1.0 normal hydrochloric acid. Even with acid of this dilution a slight floc is produced although no pitting is visible after five weeks contact. Hydrobromic acid is also suitable in low concentration.

The surface of the aluminum vessel, after being treated with the non-oxidizing acid, to induce the protective effect or inhibiting action, possesses a dulled and etched appearance without the sheen or polish possessed by the untreated metallic aluminum. Commercial hydrogen peroxide solutions in contact with aluminum surfaces not treated in accordance with the present invention react therewith and pit the same with the formation of a white flocculent material adhering to the aluminum metal and dispersed in the peroxide solution. This action continues and the metal is finally eaten through.

After contact with the hydrogen peroxide solution, the interior of the treated aluminum vessel is generally darkened, appearing brown to black, in direct light and showing interference colors in reflected light indicating the presence upon the metal of a film of deposited material in a fine state of subdivision.

After use, the vessel needs no further or additional treatment with the non-oxidizing acid as the surface, once treated with the non-oxidizing acid, acquires, after use, a passivity or inactivity towards hydrogen peroxide solutions, permitting repeated use in contact with peroxide, although if the surface be marred or scratched, the area should be again treated.

The term non-oxidizing acid as used in the claims designates an acid the hydrogen of which is liberated as gaseous hydrogen when the acid acts upon metallic aluminum.

From the foregoing it will be seen that the present invention provides a method of treating metallic aluminum vessels whereby the same can be used with safety in contact with hydrogen peroxide solutions without the destruction of the vessel and without adversely affecting the stability of the hydrogen peroxide.

What is claimed is:

1. The method of packaging hydrogen peroxide which comprises treating the interior surface of an aluminum vessel with a non-oxidizing acid to etch the same and thereafter placing hydrogen peroxide in said vessel in contact with the surface so treated.

2. The method of packaging hydrogen peroxide which comprises treating the interior surface of an aluminum vessel with phosphoric acid to etch the same and thereafter placing hydrogen peroxide in said vessel in contact with the surface so treated.

3. The method of packaging hydrogen peroxide which comprises treating the interior surface of an aluminum vessel with a non-oxidizing inorganic acid to etch the same and thereafter placing hydrogen peroxide in said vessel in contact with the surface so treated.

4. The method of packaging hydrogen peroxide which comprises treating the interior surface of an aluminum vessel with a water soluble organic acid to etch the same and thereafter placing hydrogen peroxide in said vessel in contact with the surface so treated.

5. A package comprising a container having an interior surface of aluminum and contents consisting of an aqueous solution of hydrogen peroxide, the interior surface in contact with the peroxide having been etched by treatment with a non-oxidizing acid whereby said surface is resistant to attack and corrosion by the peroxide without the necessity of adding a corrosion inhibitor to the peroxide.

6. A package comprising a container having an interior surface of aluminum and contents consisting of an aqueous solution of hydrogen peroxide, the interior surface in contact with the peroxide having been etched by treatment with an inorganic non-oxidizing acid whereby said surface is resistant to attack and corrosion by the peroxide without the necessity of adding a corrosion inhibitor to the peroxide.

7. A package comprising a container having an interior surface of aluminum and contents consisting of an aqueous solution of hydrogen peroxide, the interior surface in contact with the peroxide having been etched by treatment with phosphoric acid whereby said surface is resistant to attack and corrosion by the peroxide without the necessity of adding a corrosion inhibitor to the peroxide.

8. A package comprising a containing having an interior surface of aluminum and contents consisting of an aqueous solution of hydrogen peroxide, the interior surface in contact with the peroxide having been etched by treatment with hydrochloric acid whereby said surface is resistant to attack and corrosion by the peroxide without the necessity of adding a corrosion inhibitor to the peroxide.

9. A package comprising a container having an interior surface of aluminum and contents consisting of an aqueous solution of hydrogen peroxide, the interior surface in contact with the peroxide having been etched by treatment with a hydrohalogen acid whereby said surface is resistant to attack and corrosion by the peroxide without the necessity of adding a corrosion inhibitor to the peroxide.

10. A package comprising a container having an interior surface of aluminum and contents consisting of an aqueous solution of hydrogen peroxide, the interior surface in contact with the peroxide having been etched by treatment with a water soluble organic acid whereby said surface is resistant to attack and corrosion by the peroxide without the necessity of adding a corrosion inhibitor to the peroxide.

MAX E. BRETSCHGER.
HANS O. KAUFFMANN.
FREDERICK A. GILBERT.

CERTIFICATE OF CORRECTION.

Patent No. 2,219,293.   October 29, 1940.

MAX E. BRETSCHGER, ET AL.

It is hereby certified that error appears in the printed specification of the above numbered patent requiring correction as follows: Page 1, first column, line 27, for "anions" read --anion--; page 3, second column, line 5, claim 8, for "containing" read --container--; and that the said Letters Patent should be read with this correction therein that the same may conform to the record of the case in the Patent Office.

Signed and sealed this 10th day of December, A. D. 1940.

(Seal)

Henry Van Arsdale,
Acting Commissioner of Patents.